United States Patent [19]

Obata et al.

[11] Patent Number: 5,553,156

[45] Date of Patent: Sep. 3, 1996

[54] SIGNATURE RECOGNITION APPARATUS WHICH CAN BE TRAINED WITH A REDUCED AMOUNT OF SAMPLE DATA

[75] Inventors: Kenzo Obata, Okazaki; Yoshiki Uchikawa, Nagoya; Takeshi Furuhashi, Nagoya; Shigeru Watanabe, Nagoya, all of Japan

[73] Assignee: Nippondenso Co., Ltd., Kariya, Japan

[21] Appl. No.: 231,465

[22] Filed: Apr. 22, 1994

[51] Int. Cl.$^6$ .................................................. G06K 9/62
[52] U.S. Cl. .......................................... 382/119; 382/157
[58] Field of Search ........................ 382/3, 13, 14, 382/15, 119, 156, 157, 160; 395/21, 22, 23

[56] References Cited

U.S. PATENT DOCUMENTS

| | | | |
|---|---|---|---|
| 4,979,126 | 12/1990 | Pao et al. | 364/513 |
| 5,073,867 | 12/1991 | Murphy et al. | 395/27 |
| 5,161,204 | 11/1992 | Hutcheson et al. | 382/16 |
| 5,271,090 | 12/1993 | Boser | 395/21 |
| 5,359,699 | 10/1994 | Tong et al. | 395/22 |
| 5,390,261 | 2/1995 | Huang et al. | 382/14 |

OTHER PUBLICATIONS

Roan et al., "Fuzzy RCE Neural Network", Fuzzy Systems, International Conference 1993 (IEEE Jul. 1993), pp. 629–634.

Reed et al., "Regularization Using Jittered Training Data", Neural Networks, International Conference 1992 (IEEE), pp. 147–152.

*Primary Examiner*—Leo Boudreau
*Assistant Examiner*—Andrew W. Johns
*Attorney, Agent, or Firm*—Cushman, Darby & Cushman

[57] ABSTRACT

A signature recognition apparatus reduces the volume of training data needed and shortens the learning period. In the apparatus, a sample generating section generates sample data. A coupling load coefficient is determined based on the sample data, thereby obviating the need for additional sample data. The apparatus also uses a fuzzy net which implements a linear function in its output layer to shorten the learning period relative to the learning period required for a net implementing a non-linear function such as a sigmoid.

24 Claims, 10 Drawing Sheets

SIGNATURE RECOGNITION APPARATUS WHICH CAN BE TRAINED WITH A REDUCED AMOUNT OF SAMPLE DATA

BACKGROUND OF THE INVENTION

1. Field of the Invention

The present invention relates to a signature recognition apparatus which is based on the utilization of the learning and recognizing functions of a neural net (network) and, more particularly, to a signature recognition apparatus which is designed to produce a positive sample (true signature) and a negative sample (false signature) according to the characteristics of a hand-written signature and perform learning of the neural net based on the positive and negative samples thus provided.

2. Description of Prior Art

A signature recognition apparatus having a construction shown in FIG. 10 is known as a prior art signature recognition apparatus which is based on utilization of the learning and recognizing functions of a neural net.

Referring to FIG. 10, a signature recognition apparatus 101 comprises input means 102 for inputting a hand-written signature, characteristic extraction means 103 for extracting the characteristics of the hand-written signature, neural net means 104 for recognizing the character through the functions of a neural net, learning means 105 for automatically procuring the recognized character, coefficient storage means 106 for holding a coupling load coefficient $\alpha$ obtained by the leaning performed in the learning means, and display means 107 for displaying the output result from the neural net means 104.

To explain in more detail, among signature recognition apparatuses 101, there is an on-line recognition apparatus designed to recognize a hand-written signature by inputting various data such as writing pressure, writing speed, etc. in addition to the shape of an object character, and an off-line recognition apparatus designed to recognize a hand-written signature by inputting only the shape of an object character.

Firstly, a tablet, a digitizer or the like is used as the input means 102 used in the on-line signature recognizing apparatus from the viewpoint of the necessity for enabling inputting of real-time hand-written signature data, whereby written trace data, writing pressure data, etc. can be read therefrom. Then, the output of this input means 102 is connected to the characteristic extraction means 103. The characteristic extraction means 103 performs a Fourier transformation and spectrum analysis of the output from the input means 102 and generates an output signal to the neural net means 104. On the other hand, an image scanner device which is typically represented by a facsimile is used as the input means 102 employed in the off-line recognizing apparatus, so as to enable the shape of the object character to be read in. The characteristic extraction means 103 is so designed as to determine stroke density, and the result thus determined is outputted to the neural net means 104.

Next, a BP (Back Propagation Model) of a three-layer structure is in many cases used as the neural net means 104. The form "neural net" means a network constituted by the inputs/outputs of neurons each of which is a composing unit of the neural net. Also, the one-neuron output is usually a value obtained by transforming a total sum of the products of a plurality of coupled load coefficients $\alpha$ and an input signal i according to the sigmoid function. Therefore, in actuality, a sum-of-product computation is performed, and this is realized by use of a microcomputer, a device such as a DSP (Digital Signal Processor), a single-purpose processor, or the like.

Also, the learning means 105 is intended to actively control a feedback loop for performing learning on the neural net means 104, one method of which is to control part or all of the coupling load coefficients $\alpha$ to vary so that the coupling load coefficients $\alpha$ converge into a given value such that the output signal has minimal error with respect to expected values. And, the grading method is well known as such a method. Note that since the neural net which has performed its learning function has a recognizing function itself, once learning has been performed, the learning means 105 in many cases is separated from the neural net means 104 at the time of recognition. The coupling load coefficient $\alpha$ which has been obtained by learning is stored and held in the coefficient storage means 106.

Further, an LCD (Liquid Crystal Display), a CRT (Cathode-ray Tube, Braun Tube), or an LED (Light Emitting Diode) is used as the display means 107 to display the recognized result, display guidance for smoothly carrying out the operation, and the like.

Next, the operation of the above-constructed signature recognition apparatus will be briefly explained.

Firstly, in a case where the apparatus is of an on-line type, the hand-written signature is digitized and read on a real-time basis into the input means 102. Therefore, continuous coordinate data or writing-pressure data are obtained. The continuous signature data thus obtained is subjected to Fourier transformation and spectrum analysis in the characteristic extraction means 103, whereupon the characteristic of the hand-written signature is expressed as a spectral distribution and band intensity. On the other hand, in a case where the apparatus is of an off-line type, the X/Y map of the data inputted into the image scanner is scanned from many angles to determine the existing amount of data (stroke density). This stroke density is determined as the characteristic of the hand-written signature.

Then, the data which have been derived as the characteristic of the hand-written signature are learned in the neural net means 104 by the learning means 105, whereupon the coupling load coefficient $\alpha$ for use in the neural net means 104 is determined. On the other hand, when signature recognition is made, the learning means 105 is disconnected from the neural net means 104 from which an output 0–1 value is generated in accordance with the sigmoid function of the neural net means 104. The larger this value is, the closer the input data becomes to the learned pattern. Also, the result so recognized is displayed on the display means 107, or alternatively is in some cases transmitted as a signal to another computer or the like.

Additionally, as explained above, the neural net means 104 is able to perform only one input recognition per one-time learning. For this reason, the neural net means 104 copes with various patterns by storing various learned patterns in the coefficient storage means 106 and calling up other learned patterns therefrom as the occasion demands. Although in the above description reference has been made to signature recognizing construction/operation in the on-line recognition apparatus and those in the off-line recognizing apparatus, these differ from each other only with respect to the input means 102 and data processing in the characteristic extraction means 103. Namely, as regards the other means, both apparatuses may be regarded as the same (provided, however, that both differ in the meaning borne by the coupling load coefficient $\alpha$ in the neural net). However, in the above-mentioned prior art signature recognizing apparatus, when causing a single pattern to be learned, a small number of positive samples (true signatures) and a plurality of negative samples (false signatures) must be learned. In order to specifically recognize a hand-written signature, it is necessary to cause approximately five to ten patterns to be learned with regard to only the positive samples because of the fact that the written condition of the signature varies (character deformation occurs) due to conditions when the writer wrote the signature. As regards the negative sample, the patterns in a number which is approximately five to ten times as large as the number of those positive-sample patterns must be learned. Of course, even when only one pattern of positive samples and negative samples is learned, no hindrance will occur. However, in a case where a hand-written signature is recognized as a "positive sample", a permissible range of values which covers the degree to which the signature is deformed will decrease. Accordingly, there is the likelihood that a proper recognition is missed even when the signature is one written by a qualified person. Therefore, in order to learn for the purpose of obtaining a more accurate recognition, many positive-sample patterns and negative-sample patterns should be inputted and learned. Further, since learning is based on the use of a maximum dive method generally performed in the learning means, a very long period of time is required to complete the learning operation. As mentioned above, the prior art signature recognition apparatus has a problem in that the use of many positive/negative samples is needed for learning and registering a hand-written signature, and an additional problem is that the amount of time required to learn the samples increases in proportion to the number of the samples.

SUMMARY OF THE INVENTION

The present invention has been arrived at in view of the above-mentioned problems, and an object thereof is to cause a plurality of positive patterns and plurality of negative patterns to be automatically generated, thereby mitigating the burden upon the person inputting data during the learning operation.

Further, another object of the present invention is to impart on the signature recognition apparatus a function for shortening the learning period spent in the neural net means.

Therefore, in order to attain the above first object, the signature recognition apparatus according to the present invention comprises input means for reading a hand-written signature and outputting hand-written data corresponding to the read hand-written signature, characteristic extraction means for extracting characteristic elements from the hand-written data outputted from the input means and outputting characteristic hand-written data in accordance with the characteristic elements extracted, sample generating means for receiving characteristic hand-written data and, by multiplying the received characteristic hand-written data by means of each of a plurality of different specified coefficients, generating a plurality of truth sample data corresponding to a qualified-person's true hand-written signature and a plurality of falsehood sample data corresponding to an unqualified-person's false hand-written signature, learning control means for outputting a teacher signal in corresponding relation to whether or not the characteristic hand-written data is a qualified-person's true one, and neural net means for receiving the sample data plurally generated from the sample generating means, learning a more suitable coupling load coefficient through the comparison made between the sample data and the teacher signal, and according to the coupling load coefficient determined through said learning operation, judging whether or not the characteristic hand-written data of a newly inputted hand-written signature is the qualified-person's true hand-written data.

According to the above-mentioned signature recognition apparatus, the sample generating means receives characteristic hand-written data extracted in the characteristic extraction means and multiplies this received characteristic hand-written data by a specified coefficient, thereby generating a plurality of sample data the values of which sequentially differ from each other on a bit-by-bit basis. And the neural net means receives thereinto a plurality of sample data thus generated to perform the learning operation, thereby determining the coupling load coefficient. Further, the neural net means, according to the coupling load coefficient thus determined, judges whether or not the hand-written signature now inputted is the same as the qualified-person's true signature previously received.

That is, if no sample generating means is provided, during the learning operation of the neural net means it is necessary for a person who desires to register his hand-written signature to input his hand-written signature many times into the input means. In the present invention, however, since the sample generating means is incorporated, a plurality of sample data are spontaneously generated therefrom so as to permit the neural net means to go on performing its learning processing. This provides an excellent advantage of enabling a reduction in the amount of time and labor to be spent by the person wishing to register his hand-written signature.

Further, the signature recognition apparatus according to the present invention comprises an input means for reading a hand-written signature and outputting hand-written data corresponding to said hand-written signature read thereinto, a characteristic extraction means for extracting characteristic hand-written data from the hand-written data outputted from the input means and outputting the characteristic hand-written data, a learning control means for outputting a teacher signal corresponding to each of a qualified-person's true hand-written signature and an unqualified-person's signature, and a neural net means including an output layer for receiving the characteristic hand-written data thereinto and computing received characteristic hand-written data in accordance with a specified internal function, the neural net means being designed to perform a learning operation through comparison between the data obtained as a result of the computation performed in the output layer and the teacher signal, and to judge through the performance of the learning operation whether or not characteristic hand-written data of a newly inputted hand-written signature is the qualified-person's true hand-written signature, whereby, in the neural net means, when it performs the learning operation, the internal function of the output layer is set to be a linear function and, when it determines whether or not the characteristic hand-written data of the newly inputted hand-written signature is the qualified-person's true hand-written signature, the internal function of the output layer is set so as to be switched to a non-linear function.

Namely, according to the above-mentioned signature recognition apparatus, when the neural net means conducts its learning operation, it determines the coupling load coefficient after the internal function of the output layer is set to be a linear function (for example, $Y=X$). The boundary zone for sorting the sample data into a positive sample corresponding to a qualified-person's true signature and a negative sample corresponding to an unqualified-person's false signature is set by determining that coupling load coefficient. Then, for example, a non-linear function (e.g. sigmoid function) is set in the output layer so as to conform with the boundary zone thus set. Then, with the non-linear function being set in the output layer, it is decided whether or not a newly inputted hand-written signature is a qualified-person's true signature.

In other words, at the time of learning, the internal function in the output layer is set to be a linear function, whereas, at the time of recognition when the truth or falsehood of the hand-written signature is determined, the internal function in the output layer is set to be a non-linear function. Namely, the internal function is replaced in this way. And, usually the amount of time required in setting the boundary zone for sorting whether or not the sample data is a qualified-person's true signature is shorter, when the internal function in the output layer is a linear function, than when it is a non-linear function (sigmoid function). Therefore, the above-mentioned signature recognition apparatus enables a reduction in the length of time required for learning.

DETAILED DESCRIPTION OF THE EMBODIMENT

Figure 1:
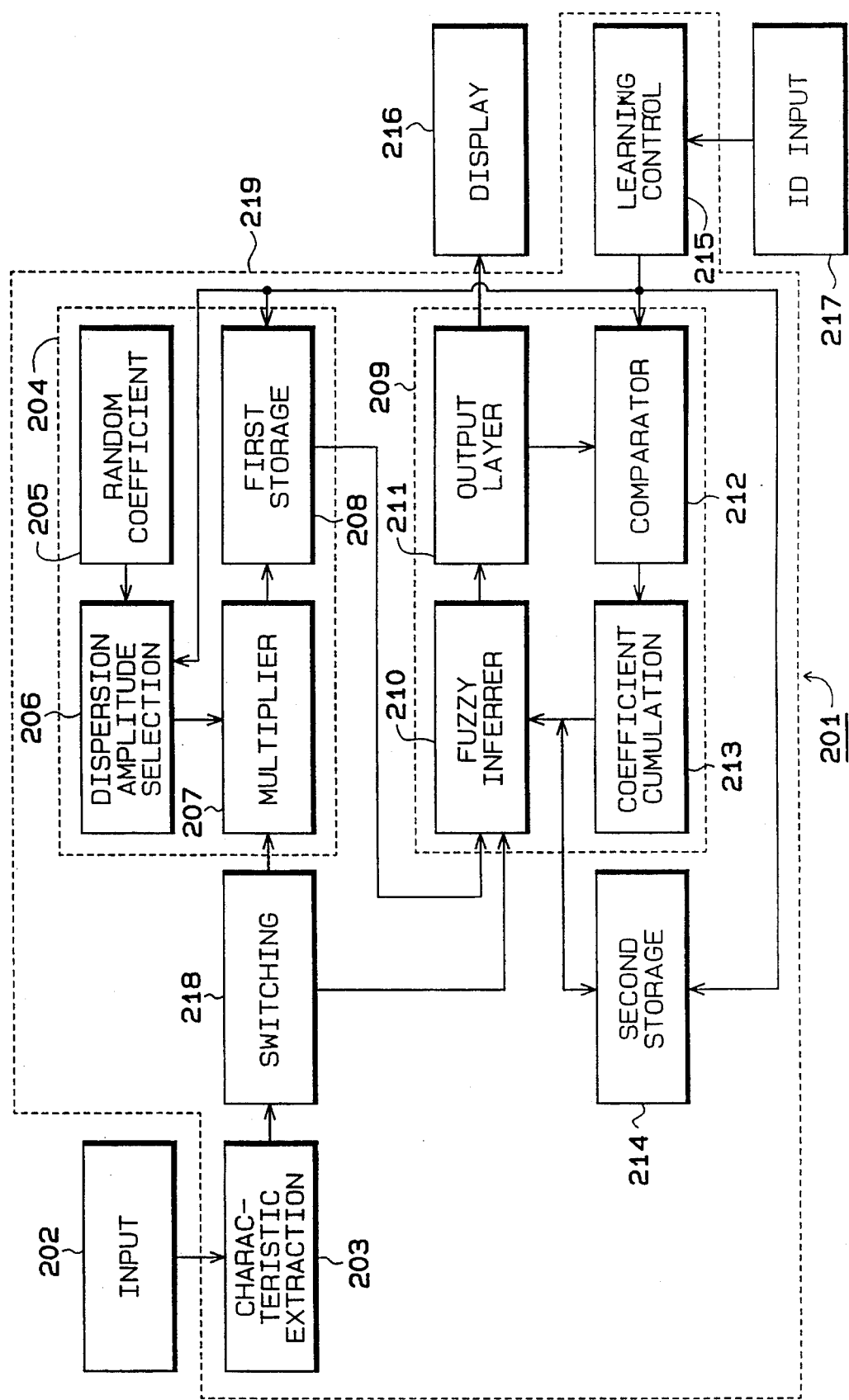
FIG. 1 is a block diagram showing an embodiment of the present invention.

Hereinafter, the present invention will be described in accordance with an embodiment illustrated in the drawings.

FIG. 1 is a structural view showing a signature recognizing apparatus according to an embodiment of the present invention.

Referring to FIG. 1, a signature recognizing apparatus 201 consists mainly of an input means 202 for reading a user's hand-written signature, a characteristic extraction means 203 for extracting the characteristic of the hand-written signature, a sample generating means 204 for spontaneously producing a sample of the hand-written signature, a fuzzy net means 209 based on the use of a two-layer simple perceptron (Perceptron) structure, a learning control means 215 for actively controlling the feedback loop in order to cause the fuzzy net means 209 to perform its learning operation, and a display means 216 for displaying the recognized result and displaying guidance for enabling smooth performance of the operation, etc.

To explain in further detail, in a case where this signature recognition apparatus is used as an on-line type signature recognition apparatus, a tablet, a digitizer, or the like is used as the input means 202 in view of the need to read real-time hand-written data, so as to enable written trace data, writing pressure data, etc. to be taken out. On the other hand, in the case where this apparatus is used as an off-line signature recognizing apparatus, an image scanner device which is typically represented by a facsimile is used as the input means so as to enable the shape of the character to be inputted thereinto. Note that, in either case, the output of the input means 202 is connected to the characteristic extraction means 203, whereupon the hand-written data read into the input means 202 is inputted to the characteristic extraction means 203.

Next, in a case where the apparatus is of an on-line type, the characteristic extraction means 203 takes in real-time continuous data such as written trace speed data, writing-pressure data, etc. as well as coordinate mapping of the hand-written signature input data. At this time, the characteristic extraction means 203 causes the hand-written data to undergo Fourier transformation so as to obtain spectrum distribution and band intensity data thereof. Note that in case of on-line characteristic extraction, obtaining this spectrum distribution and band intensity data provides good efficiency with which personal characteristics of the hand-written signature are detected.

On the other hand, in case of the off-line type signature recognizing apparatus, the characteristic extraction means 203 operates to cause the hand-written data, taken thereinto from the input means 202, to be stored once in a memory. At this time, the hand-written data stored in the memory is so set as to be arranged or stored in a two-dimensional map. At this time, the characteristic extraction means 203 accesses the hand-written data stored in the two-dimensional map from many angles, thereby determining the existing number of data and stroke density. In the case of off-line characteristic extraction, determining the stroke density of the hand-written signature provides good efficiency with which the personal characteristics of the signature is detected. The hand-written data obtained in the characteristic extraction means 203 in the above-mentioned way is taken into the sample generating means 204 via a switching means 218 connected to the output side of the characteristic extraction means 203.

Next, the sample generating means 204 includes a random coefficient generating means 205, a dispersion-amplitude selecting/generating means 206, a multiplying means 207, and a first storage means 208. It receives a control signal from the learning means 215 and receives an output signal from the characteristic extraction means 203 to generate a positive sample (qualified-person's signature) or a negative sample (unqualified-person's signature).

To explain in further detail, the output of the random coefficient generating means 205 is connected to the dispersion-amplitude selecting means 206. When generating a positive sample (qualified-person's signature), for example, the dispersion-amplitude selecting means 206 selects a numeric value capable of limiting the amplitude of dispersion in the random numeric values outputted from the random coefficient generating means 205 to 5% or less of a maximum dispersion amplitude value. On the other hand, when generating a negative sample (unqualified-person's signature), the dispersion-amplitude selecting means 206 selects a numeric value capable of limiting the above variation width to from 20% to 25% or less of the maximum dispersion amplitude value. In the case of other ranges (of not less than 25% or of from 6 to 19%), the random numeric values are regarded as being invalid and kept out of use. In this way, the dispersion-amplitude selecting means 206 selects random numeric values according to operational states. Further, the multiplying means 207 connected to the output of the dispersion-amplitude selecting means 206 multiplies the hand-written data outputted from the above-mentioned characteristic extraction means 203 by the random coefficients outputted from the dispersion-amplitude selecting means 206, to artificially generate a plurality of samples. These samples are outputted into the first storage means 208, in which they are sequentially stored.

Figure 2:
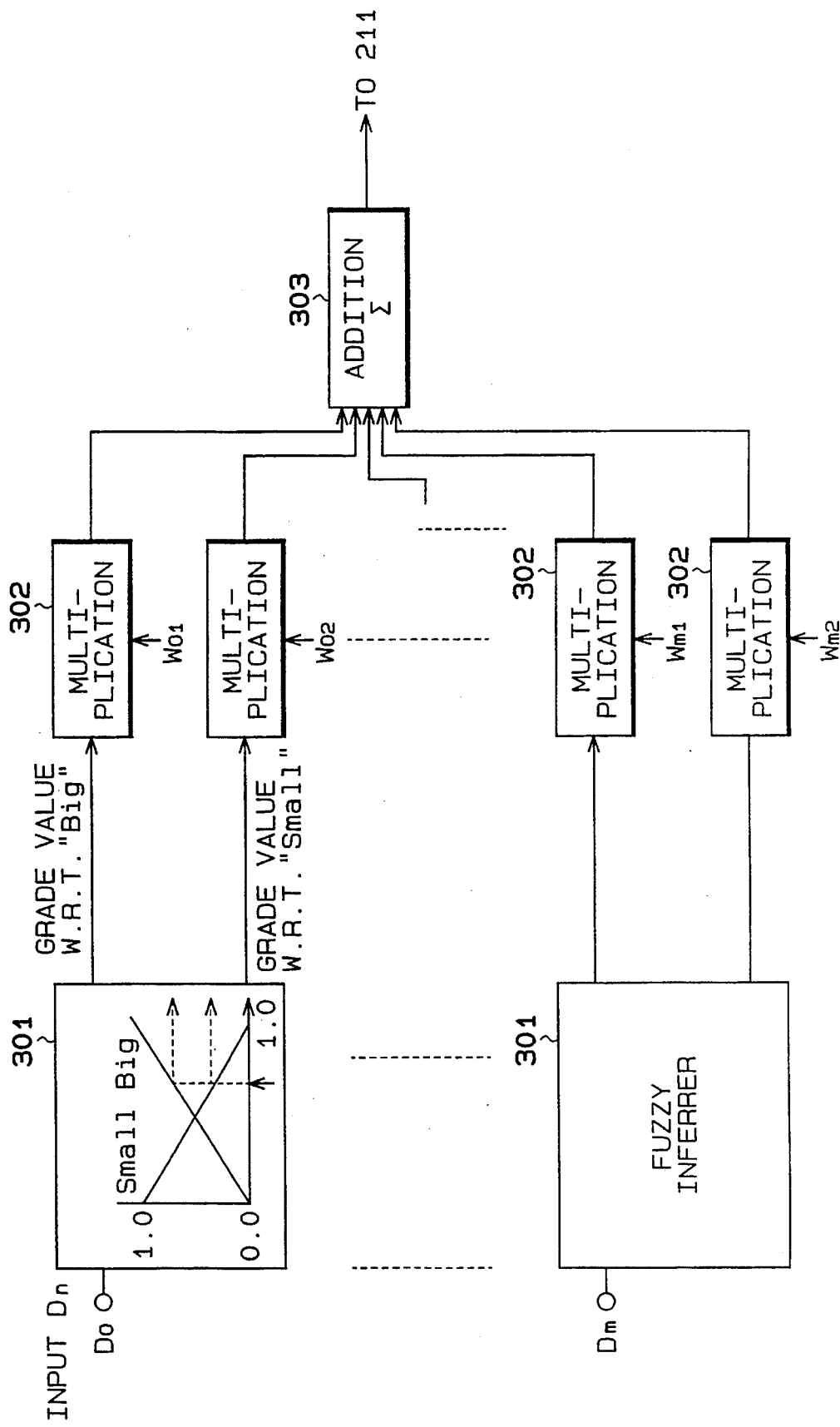
FIG. 2 is a detailed block diagram of a fuzzy inference section shown in FIG. 1.

Next, the fuzzy net means 209 includes a fuzzy inference section (including an input layer) 210, an output layer 211, a comparator section 212, and a coefficient adding-up section 213. It is a fuzzy net having a two-layer perception structure in which the unidirectional data from the input layer to the output layer 211 is multiplied by a weighting coefficient (coupling load coefficient). Note that the input layer characteristically consists of a fuzzying means whose internal function is a membership function; and the output layer 211 characteristically is constructed such that the inference rule is set. To explain in further detail with reference to FIGS. 1 and 2, the fuzzy inference section 210 has a fuzzy inferrer 301 in its input layer, which has membership functions consisting, respectively, of two, small and big, rules such as are shown in FIG. 2, as its internal function. Using the data received from the input layer, as the input of the two membership functions, the fuzzy inferrer 301 calculates a grade value corresponding to each of the membership functions. Constructed on the output side of the fuzzy inferrer 301 are multiplying means 302 which operate to compute a multiplication of the grade value outputted from the fuzzy inferrer 301 by a coupling load coefficient Wij. The output of the multiplying means 302 is connected to an adding means 303, which computes the total sum of the output results from all the multiplier means 302 so as to output it to the output layer 211.

Next, in the output layer 211, the internal function is set, and the signal outputted from the fuzzy inference section 210 is subjected to computation processing according to this internal function to generate an output result to the comparator section 212. Further, the comparator 212 is connected thereto with the output of the output layer 211 and the output of the learning control means 215, and receives an output signal from the output layer 211 and an output teacher signal from the learning control means 215 to compute a difference between the two. Further, the coefficient cumulating section 213 receives the signal outputted from the comparator 212 and computes a renewed amount of the coupling load coefficient Wij in accordance with the signal received thereby and sequentially adds up the renewed amounts thereof, to output a total sum obtained by those adding-up operations to the multipliers 302 inside the fuzzy inference section 210.

Further, a second storage means 214, at the time of learning, stores and holds the determined coupling load coefficient Wij for each user who has registered his handwritten signature and, at the time of recognition, reads out the coupling load coefficient Wij stored and held at the time of learning, according to the signal from the learning control means 215, and outputs the read-out coupling load coefficient Wij to the fuzzy net means 209.

The learning control means 215 controls each of the dispersion amplitude selecting means 206, first storage means 208, comparator section 212, and second storage means 214, for example, with a positive sample or a negative sample being controlled to be in corresponding relation. The detailed operation thereof will be described later.

A liquid crystal display, CRT or the like, for example, is used for the display means 216 and, in this embodiment, displays the decision result on whether the hand-written data indicates a true signature or a false signature, or displays a reproduced image of the input hand-written data as a reproduction curve or the like. Further, an ID input means 217 is an input means such as, for example, a keyboard or the like.

The switching means 218 is disposed between the characteristic extraction means 203 and the sample generating means 204, and at the time of learning, transmits the hand-written data to the sample generating means 204, and at the time of recognition, transmits it to the fuzzy net means 209, thus connecting the sample generating means 204 to, or disconnecting it from, the characteristic extraction means 203.

Additionally, each of the characteristic extraction means 203, sample generating means 204, fuzzy net means 209, second storage means 214, and learning control means 215 is controlled in accordance with the programs stored in CPU 219 and their operation are thus executed.

Next, the operation of the above-constructed signature recognizing apparatus is composed of two modes, one of which is (1) a learning mode, and the other of which is (2) a recognizing mode. The apparatus operates first in the learning mode and then in the recognizing mode, thus operating as a signature recognizing apparatus. The two operation modes are described below.

(1) Learning Mode

Figure 3:
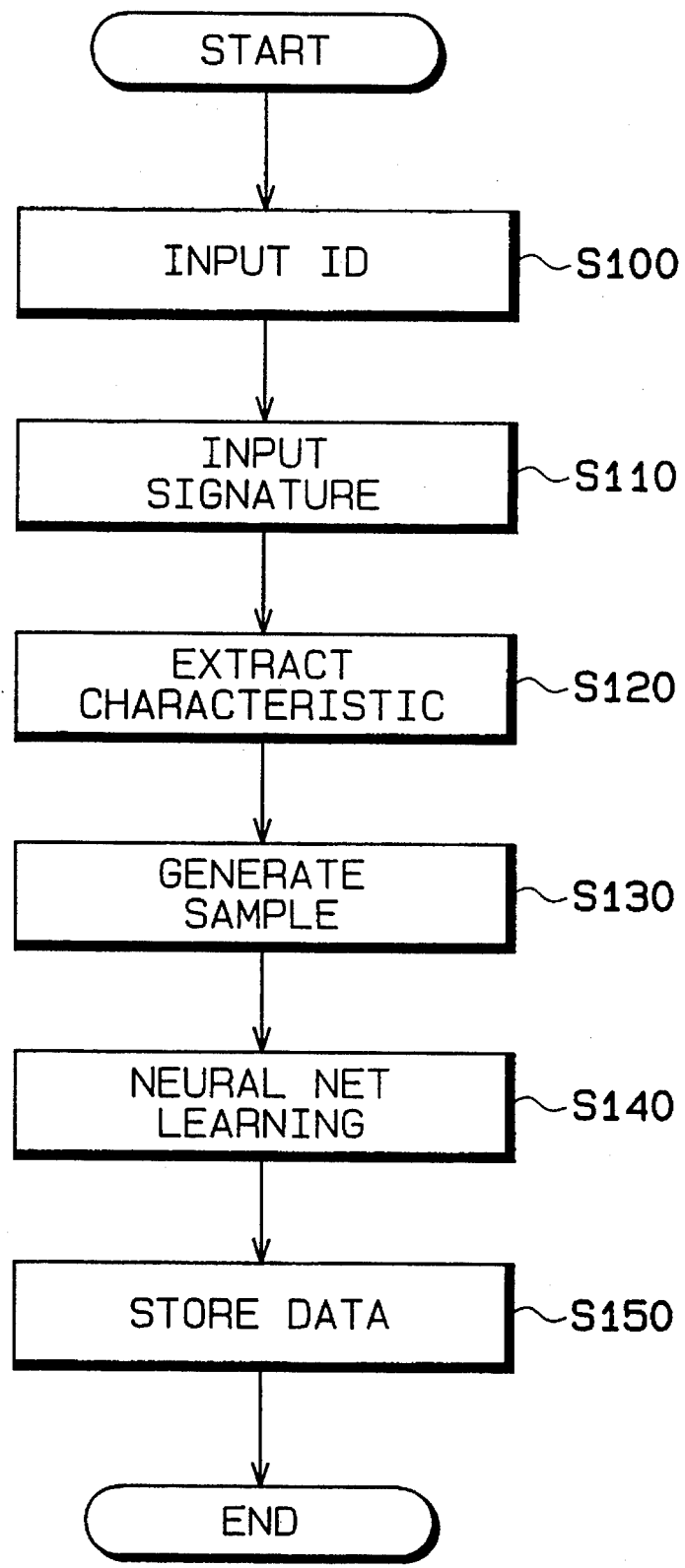
FIG. 3 is a flowchart showing the operation of the embodiment during the performance of learning therein.

The overall operation in the learning mode will first be described in accordance with the flowchart shown in FIG. 3. Note that FIG. 3 is a flowchart showing the operation of the CPU 219.

First of all, in step 100, a user who desires registration of his signature inputs an ID (identification) code from the ID input means 217, whereupon the learning control means 215 receives the ID code signal generated from the ID input means 217. This ID inputting process functions to label a registration number for causing the user, who desires registration of his signature, to conform, during the operation processing, with the hand-written data which is to be inputted under the below-mentioned process.

In step 110, the user who has inputted his ID code makes his hand-written signature by using the input means 202, whereupon the input means 202 outputs hand-writing data corresponding to the hand-written signature.

In step 120, the characteristic extraction means 203 receives the hand-written data outputted from the input means 202. At this time, the characteristic extraction means 203 extracts the characteristic portions from the hand-writing data received thereby, to output those characteristic portions as characteristic hand-writing data. A more detailed description of the characteristic extraction means 203 operation is set forth below.

In step 130, the sample generating means 204 receives the characteristic hand-writing data outputted from the characteristic extraction means 203. In accordance with the characteristic hand-writing data received, the sample generating means 204 spontaneously generates a positive sample (qualified-person's signature) and a negative sample (unqualified-person's signature) to cause the sample data thus generated to be sequentially stored into the first storage means 208. The detailed operation of this sample generating means 204 is set forth below.

In step 140, the fuzzy net means 209 receives the characteristic hand-writing data which have been sequentially stored in step 130. Thereafter, the fuzzy net means 209 goes on to learn personal characteristics from the characteristic hand-writing data it has received, thereby obtaining a border line necessary as the judging condition for making judgment of the positive sample (qualified-person's signature) and the negative sample (unqualified-person's signature). Note that the detailed operation thereof is described below.

In step 150, the second storage means 214 stores the data of the judgment conditions determined in the fuzzy net means 209, together with the above-mentioned ID (identification) codes.

Through the above-mentioned operations, learning of a hand-written signature corresponding to a particular ID code is performed. Next, the above-mentioned operations will each be described in detail.

Figure 4:
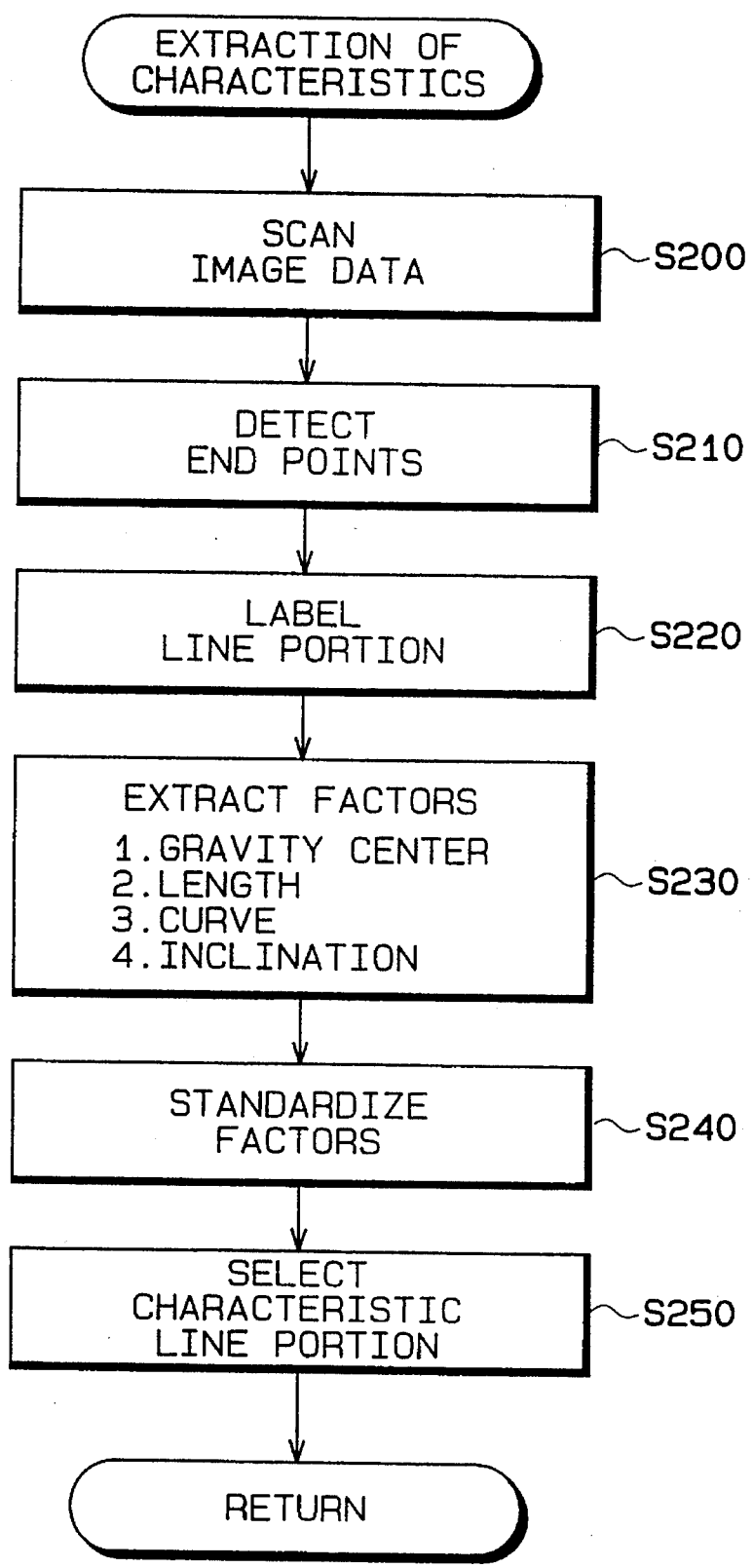
FIG. 4 is a flowchart showing the operation of a characteristic extraction means shown in FIG. 1.

First, the operation in step 120, i.e. the detailed operation of the characteristic extraction means 203, will be described. FIG. 4 is a flowchart showing the operation of the characteristic extraction means 203. As regards this operation, an explanation will be given with regard to a case where characteristic extraction on an off-line basis (specifically, a characteristic line portion extracting method) is performed.

In step 200, the characteristic extraction-means 203 temporarily stores the hand-writing data received from the input means 202 in a memory (not shown) as 1 and 0 picture-element data (presence and absence of a dot), and then extracts line-portion data therefrom by thinning. At this time, the picture-element data are scanned from many directions including upward, downward, right and left, whereupon the shadows of the hand-written signature produced when this scanning is performed are taken out as thinned line-operation data. Note that this technique of thinning only requires a small amount of computing time because the data is simplified, and enables the personality characteristic of the hand-written signature to be substantially retained.

Figure 5A:
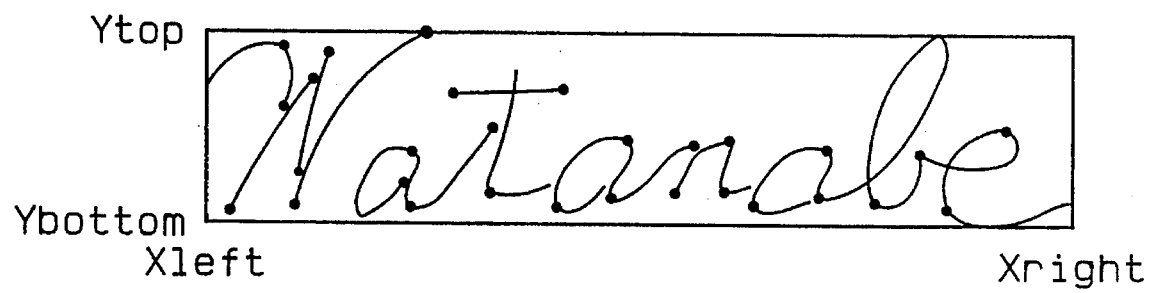
FIGS. 5A and 5B are explanatory views showing a method of extracting characteristic elements in the embodiment.

In step 210, end dots are detected, as shown in FIG. 5A, from the image data obtained by the thinning technique. Also, a shadow portion extending from one end dot to another is defined as one line portion, by which an item of line-portion data is thus taken out.

In step 220, this line-portion data is labeled with the above-mentioned ID code, thereby performing the line-portion data labeling.

Figure 5B:
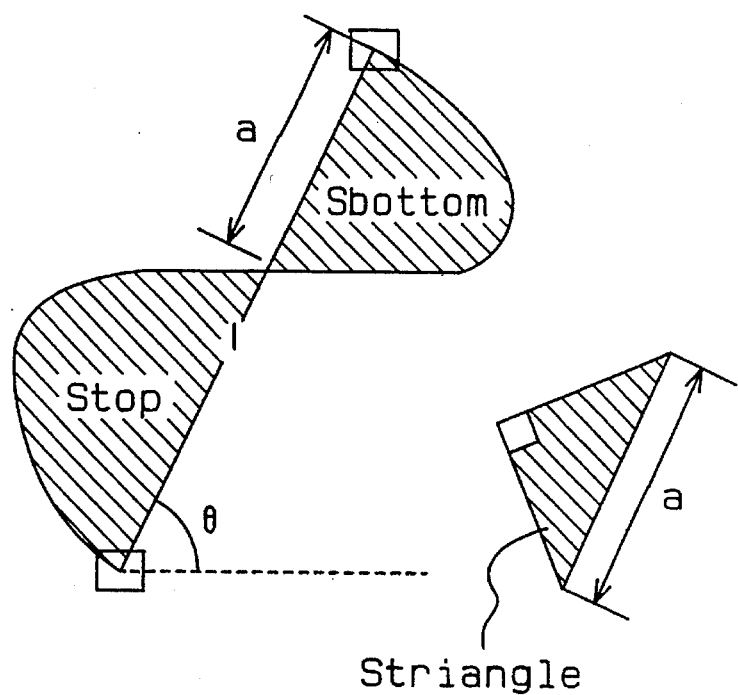

In step 230, the following factors are taken out from the line-portion data obtained by thinning. The factors to be taken out are parameters that include (1) the gravity-center position (X,Y), (2) the length (L), (3) the curve (Stop, Sbottom), and (4) the inclination ($\theta$). It is to be noted that the curving of the line-portion data is defined, as shown in FIG. 5B, by a straight-line portion i connecting the end spots of the line-portion data to each other and an area surrounded by the line-portion data. Further, the inclination $\theta$ is an angle defined between the straight-line portion 1 and the horizontal line.

In step 240, the above-mentioned parameters are standardized in the following manner. Firstly, the gravity-center position (X,Y) is standardized by the right/left width and the top/bottom width (FIG. 5A: Xleft to Xright, Ytop to Ybottom) of the hand-written signature obtained by thinning while the length L is standardized by a maximum value (Lmax) of the hand-written signature. These parameters are represented by X, Y, and L, respectively. Further, the curving is standardized by using the area (triangle) of an equilateral right-angled triangle having a part of a straight-line portion 1 as its oblique lines (see FIG. 5B), and is represented by Stop and Sbottom. The inclination is standardized by from $-\pi/2$ to $p/\pi2$ and is represented by $\theta$. Through the above processing, six parameters (X, Y, L, Stop, Sbottom, and $\theta$) can be obtained from one line-portion data.

In step 250, from among the factors standardized as above, the factors to be employed are selected according to the scale of the neural net. The reason for this is that, although use of all the parameters would enable expectation of a high recognition ratio, in this embodiment the parameters selected from among such factors will be employed because such use requires the neural network to be increased in scale per se.

Figure 6:
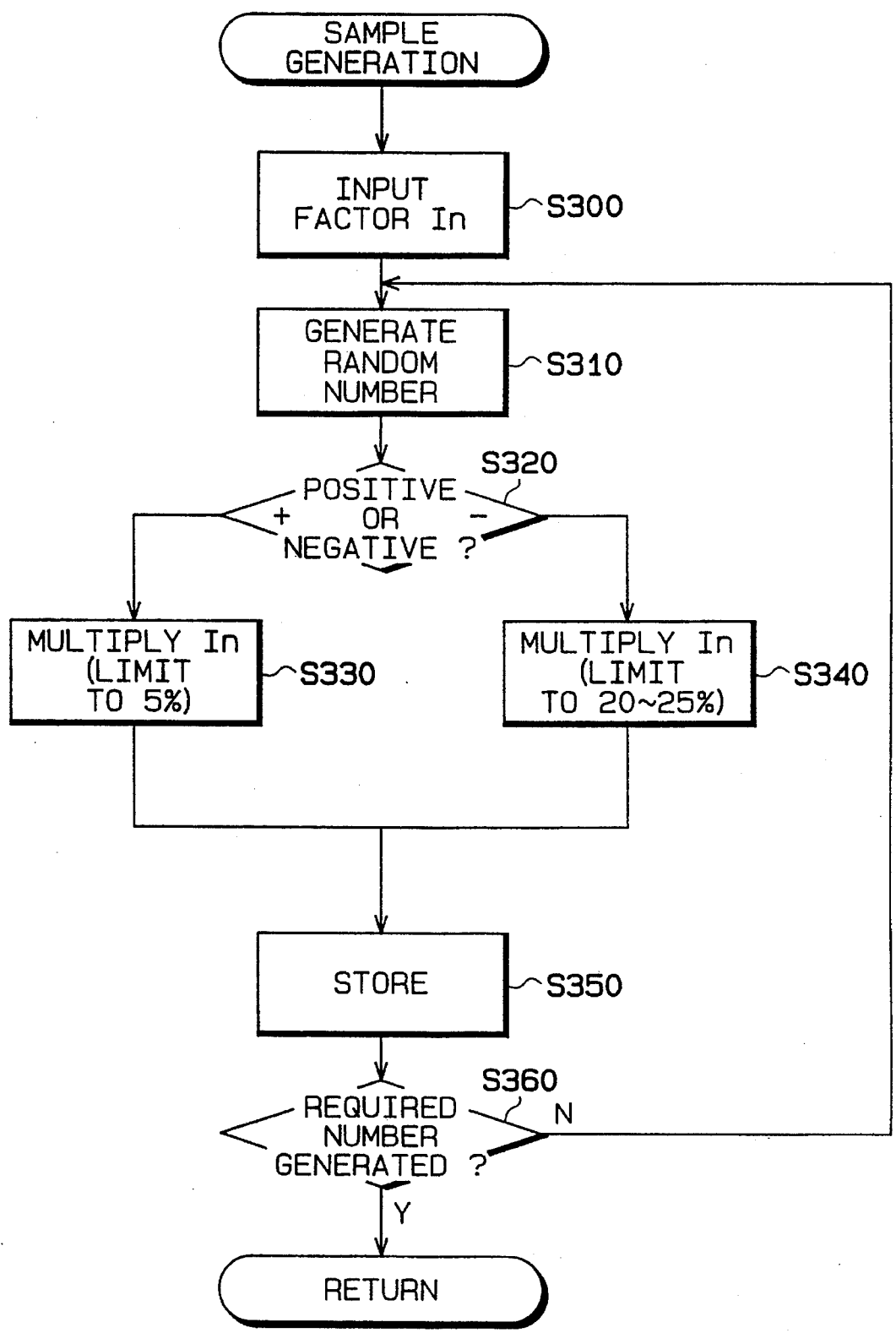
FIG. 6 is a flowchart showing the operation of a sample generation means shown in FIG. 1.

Next, the operation in step 130, i.e. the detailed operation of the sample generating means 204, will be described. FIG. 6 is a flowchart showing the operation of the sample generating means 204.

First, in step 300, the sample generating means 204 receives the characteristic hand-writing data (characteristic factor In) outputted from the characteristic extraction means 203. Then, the operation proceeds to step 310 in which the following processing is executed. Namely, the sample generating means 204 starts its spontaneous sample generation processing of a positive sample (qualified-person's signature) and negative sample (unqualified-person's signature) in accordance with the control signal from the learning control means 215.

In step 310, the random coefficient generating means 205 generates random numbers. Note that these random numbers are coefficients by which the characteristic hand-writing data are multiplied.

In step 320, the random numbers which have been generated from the random coefficient generating means 205 are received by the variation-width selecting means 206. Further, from those random numbers, random-number selection is made by the dispersion-amplitude selecting means 206 according to the control signal from the learning control means 215 in such a manner that, at the time of generating a positive sample, a random number capable of limiting the variation width to 5% or less of a maximum variation width value is selected and at the time of generating a negative sample, a random number capable of limiting the variation width to from 20 to 25% or less of the maximum variation width value is selected. In this case, when the hand-writing data is to be processed as a positive sample, the operation proceeds to step 330. When it is to be processed as a negative sample, the operation proceeds to step 340.

Subsequently, in step 330, the multiplying means 207 receives the random coefficient (the coefficient capable of limiting to 5% or less of the maximum dispersion-amplitude value) selected in the dispersion-amplitude selecting means 206 and the characteristic hand-writing data outputted from the characteristic extraction means 203, thereby multiplying the characteristic hand-writing data by the random coefficient. On the other hand, in step 340, the characteristic hand-writing data is multiplied by the random coefficient (the coefficient capable of controlling to from 20 to 25% or less of the maximum variation width value) corresponding to a negative sample.

In step 350, the positive/negative sample data corresponding to the results obtained as results of the multiplications in step 330 and 340 are sequentially stored in the first storage means 208. Further, in step 360, it is determined whether or not the number of positive/negative sample data is a required number of positive/negative sample data. The operation processing in steps 310 to 360 are repeatedly carried out until it is determined that the number thereof is the required number.

Through the execution of the foregoing processing, if each of the positive and negative samples generated with regard to one user's input hand-written signature is multiplied five times by a different coefficient, for example, this means that the user's hand-written signature inputting has been equivalently performed ten times.

Incidentally, although, in selecting the random coefficient, the setting thereof has been done such that in the case of generating a positive sample, a random number is set which is capable of limiting the dispersion-amplitude to 5% or less of the maximum dispersion-amplitude value, whereas, in the case of generating a negative sample, a random number is set which is capable of limiting the dispersion-amplitude to from 20 to 25% or less of the maximum dispersion-amplitude value, by way of example. However, the invention is not limited thereto. A set value between the coefficient for a positive sample and the coefficient for a negative sample (e.g. from 6 to 19% coefficients if this is said in the above-mentioned embodiment) is left out of adoption as minimum permissible conditions for setting of a random number. This is because such a set value would make judgment of a qualified-person and an unqualified-person inaccurate. Further, a random number by which it is clear that the hand-writing data is remarkably different from the qualified-person's hand-written signature (a random coefficient in a variation width range of 25% or more if this is said in the above-mentioned embodiment) is also left out of adoption because the storing of such a random number is meaningless in making a relevant judgment.

Next, the operation in step 140, that is, the detailed operation of the fuzzy net means 209 will be described. Note that the below-mentioned operation is one in the learning mode which is concerned with the processing operation for setting of the coupling load coefficient Wij in determining whether or not the hand-written signature is a qualified-person's signature.

Figure 7:
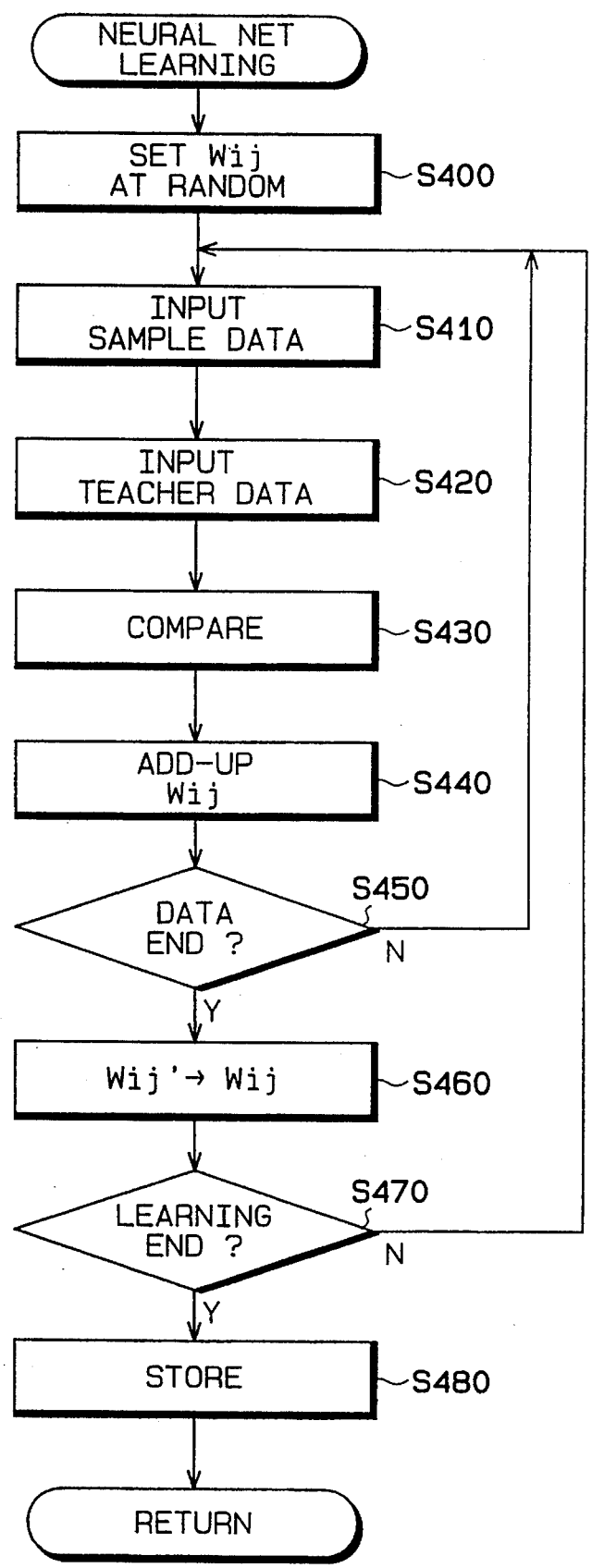
FIG. 7 is a flowchart showing a fuzzy net means shown in FIG. 1.

FIG. 7 is a flowchart showing the operation of the fuzzy net means 209.

First, in step 400, the coupling load coefficient Wij is set to be a random numeric value, for initialization.

Then, in step 410, the sample data that have been sequentially stored in the first storage means 208 are received in the input layer, i.e. fuzzy inference section 210 of the fuzzy net means 209, whereupon the following fuzzy inference is made.

First of all, this fuzzy inference is a processing for causing the absorption of the fluctuations occurring in a hand-written signature which delicately vary for each writing even when the signature is hand written by the qualified person. In this embodiment, the fuzzy net structure shown in FIG. 2 is adopted. As shown in FIG. 2, this fuzzy net receives the relevant parameters of sample data such as the gravity-center position, length, curving, and inclination (X, Y, L, Stop, Sbottom, θ) via the input section Do to Dm thereof. The sample data thus received are used as the inputs of the two membership functions consisting respectively of two, Big and Small, values and set in the fuzzy inferrer 301, and a grade value corresponding to each membership function is calculated. Thus, for example, if the input value is 0.8, the membership function has a "Big" rule, and a grade value of 0.8+a (a>0) is outputted. If in said case, the membership function has a "Small" rule, then a grade value of 0.8−b (b>0) is outputted. As a result, the fuzzy net performs its computation processing with a specified margin (a+b) as measured from the input value of 0.8 as a center value. For this reason, it is possible to cause the absorption of the fluctuations occurring in a hand-written signature that delicately fluctuates for each writing even when the signature is hand written by a qualified person. Next, both grade values thus computed are inputted to the multiplier means 302 in which each grade value is multiplied by the coupling load coefficient Wij. The adder means 303 calculates a sum of the resulting values and transmits it to the output layer 211 as an output unit. The output layer 211 calculates data values (from 0.0 to 1.0) corresponding to the positive and negative samples, in accordance with the internal function set beforehand, e.g. a linear function of $Y=\alpha X$ ($0.0 \leq X \leq 1$). The calculated results are inputted into the comparator section 212.

Figure 9B:
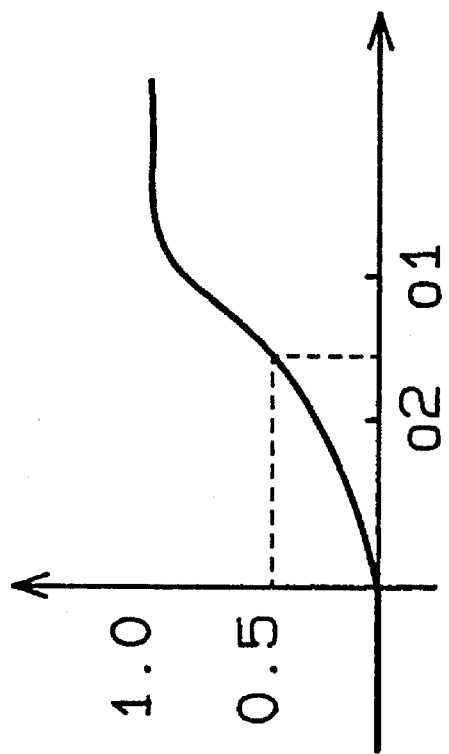
FIG. 9B is a characteristic curve diagram showing a function approximated by straight lines to the sigmoid function shown in FIG. 9A.
Figure 9A:
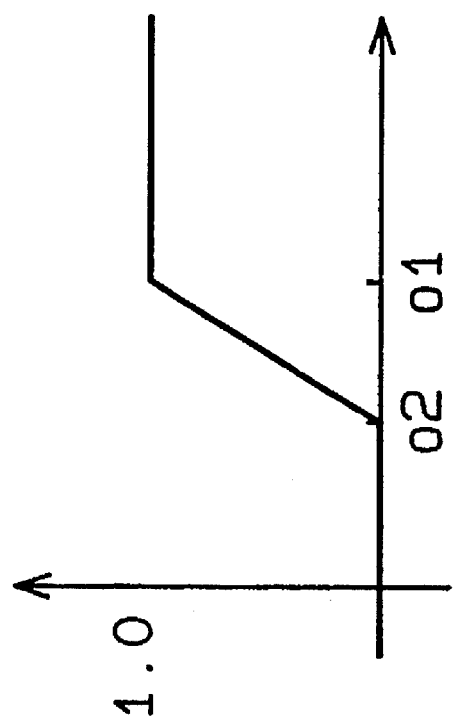
FIG. 9A is a characteristic curve diagram showing the sigmoid function set in an output layer of the fuzzy net means shown in FIG. 1.
Figure 10:
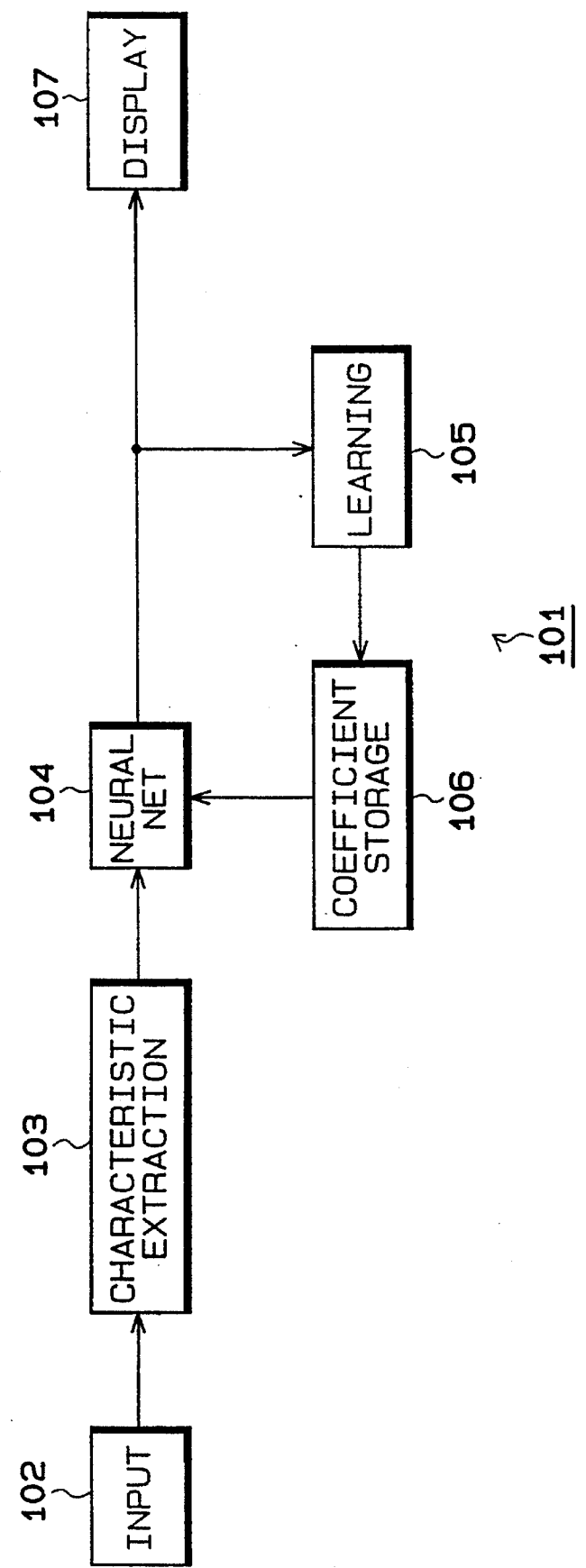
FIG. 10 is a block diagram showing a prior art signature recognition apparatus.

Through the above-mentioned processing in which the above-mentioned linear function is employed, it is possible to determine a border zone for sorting the sample data into positive sample data and negative sample data in a shorter time than in the case of employing the non-linear function (sigmoid function, etc.) that is generally employed in the prior art. The reason for this is as follows. When initialization is made in the learning mode, the coupling load coefficient Wij is set to be a random numeric value. If in this condition, the data value (from 0.0 to 1.0) corresponding to the positive and negative samples are each multiplied by the coupling load coefficient Wij, the data values transmitted to the output layer 211 similarly exhibit variations on the X axis of the sigmoid function shown in FIG. 9A. For example, the data value that is set on the X axis of the sigmoid function, in some cases, is set to be around 0 even in the case of a positive sample, or in some cases, is set to be around 1 even in the case of a negative sample. These data values finally are each set to be around 1 in the case of a positive sample and around 0 in the case of a negative sample through the variation in the coupling load coefficient Wij by performance of the learning operation. However, in such a sigmoid function as shown in FIG. 9A, a larger amount of operation is needed until a decision is made as to whether the data value is 0 or 1 (the amount of change at around "0" and that at around "1"), as compared with the employment of a linear function $Y=\alpha X$ as in the present invention. For this reason, for example, if in the condition of initialization, the data value for a positive sample is set to be around 0, it is necessary to vary the coupling load coefficient Wij by learning so that the data value for a positive sample may be changed to be around 1. In the case of the linear function $Y=\alpha X$, this amount of change may be smaller than in the case of the sigmoid function. Accordingly, the use of the linear function as in the present invention enables determination of a positive-sample/negative-sample sorting border zone in the learning process in a shorter time than the use of the non-linear function (sigmoid function, etc.) made in general in the prior art.

Next, in step 420, a teacher signal T (in the case of a positive sample, 1.0 and in the case of a negative sample, 0.0) which is another input data is applied to the comparator section 212 of the learning control means 215. Note that this teacher signal T corresponds to each of the positive and negative sample data sequentially stored in the first storage means 208. Namely, if the sample data supplied from the first storage means 208 is a positive sample, the signal outputted from the learning control means 215 is also a teacher signal T (1.0) corresponding to the positive sample. If the sample data supplied is a negative sample, the signal outputted from the learning control means 215 is also a teacher signal T (1.0) corresponding to the negative sample.

In step 430, in the comparator 212, the difference between the output from the output layer 211 and the teacher signal T is computed, and the difference obtained is inputted to the coefficient adding-up section 213.

In step 440, in the coefficient adding-up section 213, the renewed amount of the coupling load coefficient Wij is computed using the output from the comparator 212 in accordance with the delta rule, and this renewed amount is sequentially added up. The delta rule for determining the renewed amount of the coupling load coefficient Wij is represented by the following expression (1):

$$\Delta W(t) = \eta(\text{teach} - O(t))Y'*Y(t) + \beta \Delta W(t-1) \tag{1}$$

where $\Delta W(t)$ represents the renewed amount, $\eta$ is the learning ratio, teach is the teacher signal, $O(t)$ is the output of the fuzzy net means, $Y'$ is the differentiated value of the linear function, $Y(t)$ is the output of the input layer, and $\beta$ is the inertial coefficient.

In step 450, the operations in steps 410 to 450 are repeatedly carried out until it is decided that all the sample data have been computed in accordance with the delta rule.

Thereafter, in step 460, a total sum of the renewed amounts computed in step 450 is made $\Delta W_{ij}$ and the value ($W_{ij} + \Delta W_{ij}$) is defined as a new coupling load coefficient $W_{ij}'$. In this way, the coupling load coefficient Wij is changed thereto. Note that this way of changing the coupling load coefficient Wij is called an "Epoch mode". The Epoch learning mode is excellent in that convergence of the learning operation for determining the coupling load coefficient Wij to be a certain value is reliably ensured.

Next, in step 470, in accordance with the judging conditions which will be explained below, the renewing operation of the coupling load coefficient Wij is completed, and the coupling load coefficient Wij at the time of completion thereof is recognized as the coupling load coefficient Wij which corresponds to the user who has inputted his hand-written signature. The judging standard according to which the renewing operation is completed is a time at which it has been decided, when the coupling load coefficient Wij is newly changed and all the data have thus been outputted from the output layer 211, that a minimum value of the positive sample data values is larger than a maximum value of the negative data values. In other words, in the process in which the coupling load coefficient Wij is changed and renewed, the distribution of the output positive-sample and the distribution of the output negative-sample data gradually part from each other. Also, when in such a process, the above-mentioned judging conditions have been satisfied, it means that a boundary exists between the two, whereupon learning is completed. Namely, the coupling load coefficient Wij causing such boundary to be produced is an optimum coupling load coefficient Wij for enabling the positive and negative samples to be sorted from each other. Thus, learning is completed at a time when such optimum coupling load coefficient Wij has been recognized.

In step 480, the coupling load coefficient Wij at the time when the learning is completed is stored in the second storage means 214.

The foregoing process is the detailed operation of the fuzzy net means 209.

2) Recognizing Mode

Figure 8:
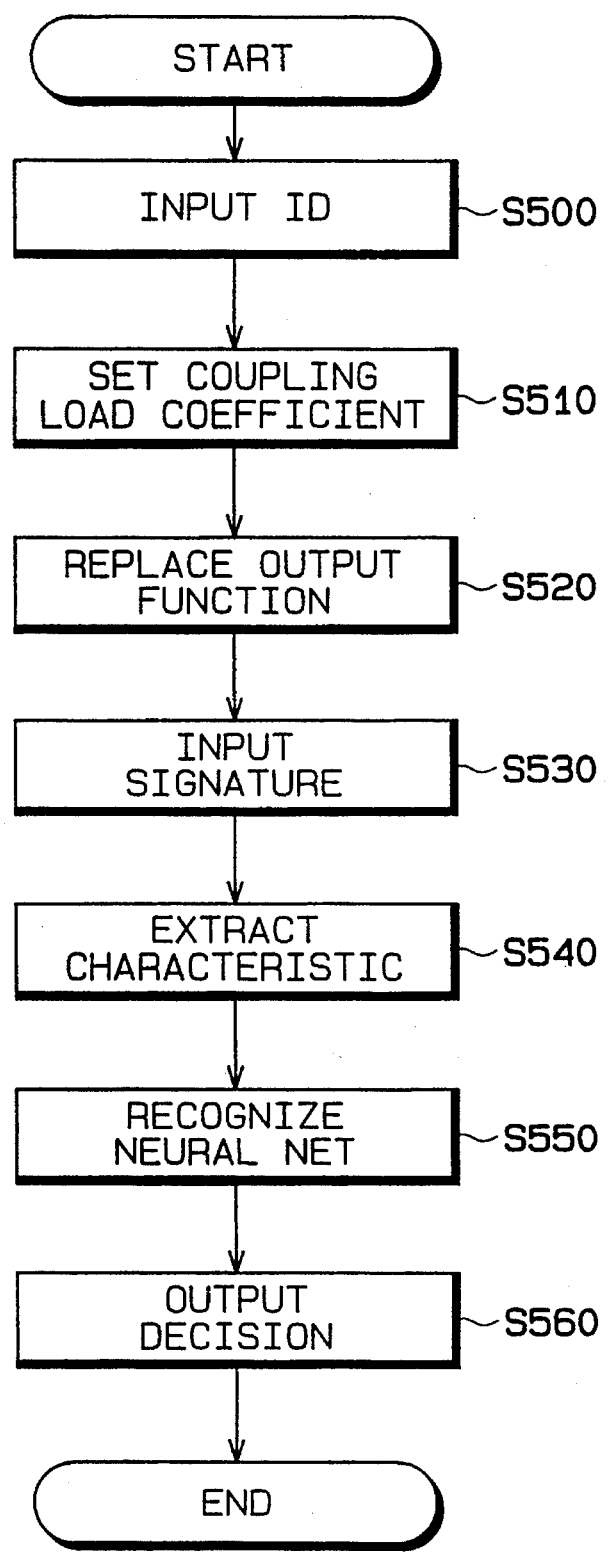
FIG. 8 is a flowchart showing the operation of the embodiment during the performance of recognition therein.

Next, the operation for recognition processing will be described. FIG. 8 is a flowchart showing the operation for recognition processing.

First, in step 500, an ID (identification) code is inputted by a user from the input means 217 in the same manner as in learning. As a result, the learning control means 215 receives the ID signal outputted from the ID input means 217.

In step 510, the coupling load coefficient Wij corresponding to the ID code previously inputted in step 500 is called up from the second storage means 214 and this coupling load coefficient Wij is set in the fuzzy net means.

In step 520, the internal function set in the output layer 211 is reset from the linear function ($Y = \alpha X$) to a non-linear function such as a sigmoid function or the like. At this time, a method of using a center point $(o1 + o2)/2$ between a minimum value o1 of the output positive-sample data values and a maximum value o2 of the negative-sample data values in the course of learning, as the center of the sigmoid function as shown in FIG. 9A, is used as a method of replacing with the sigmoid function.

After the preparation for the recognition processing is finished in the above way, the operational step proceeds to step 530, in which the user's inputted hand-written signature is received via the input means 202.

In step 540, the hand-written data received via the input means 202 is inputted into the characteristic extraction means 203 and characteristic portions are extracted from the input hand-writing data. Note that the operation of this characteristic extraction means 203 is the same as that performed therein during the above-mentioned learning operation.

In step 550, the characteristic elements of the signature extracted in the characteristic extraction means 203 received in the fuzzy net means 209 through the switching operation of the switching means 218. At this time of recognition processing, the fuzzy net means 209 is composed of the fuzzy inference section 210 (fuzzy inferrer 301, multiplier means 302 and adder means 303) and the output layer 211, the use of the coefficient adding-up section 213 and the comparator 212 being omitted. The characteristic elements of the signature inputted into the fuzzy net means 209 are inputted into the fuzzy inferrer 301, whereupon the characteristic hand-writing data are divided into two, Big and Small, groups through the operation of the fuzzy inference function. As a result, the fluctuations occurring in a hand-written signature that delicately fluctuates for each writing even when the signature is written by a qualified person, are absorbed as in the case of the above-mentioned learning operation. Next, in the multiplier means 302, the output data from the fuzzy inferrer 301 is multiplied by the coupling load coefficient Wij read from the second storage means 214 and a total sum of the resulting products is computed in the adder means 303. The total sum computed in the adder means 303 is subjected to computation in accordance with the internal function set in the output layer 211. The internal function set in the output layer 211 is a sigmoid function that is shown in equation (2), that is, a non-linear function shown in FIG. 9A.

$$O = 1/(1 + e^{-s}) \tag{2}$$

where O represents the output and S represents the input.

According to the above sigmoid function, as the value of the input S increases, the value of the output O approaches 1. Therefore, if the characteristic hand-writing data is inputted and this data is in approximation to the data value that has been learned as a positive sample, a value that is approximate to 1 is outputted from the fuzzy net means 209. This means that this data is in approximation to the "truth". Conversely, if that data is in approximation to the data value which has been learned as a negative sample, a value, which is approximate to 0, is outputted from the fuzzy net means 209. This means that this data is approximate to "falsehood". Note that the above sigmoid function may be replaced by a function shown in FIG. 9B that is obtained by approximating or interpolating the sigmoid function by a straight line.

Thereafter, in step 560, the signal that indicates the result recognized in the fuzzy net means 209 is transmitted to the display means 216. Namely, the result of the truth or falsehood, or the degree of truth or falsehood, is displayed therein, whereupon the signature recognition processing operation is completed.

Additionally, in the above-mentioned embodiment, the two-layer perceptron structure has been adopted as the neural net structure. However, the invention is not limited thereto, but permits the adoption of, for example, a three-layer BP (Back Propagation) Model, or the like.

Further, although, in the above-mentioned embodiment, the Epoch mode has been used for renewal of the coupling load coefficient Wij, the invention permits the use of, for example, a Pattern mode. It is desirable, however, to use the Epoch mode in that convergence of learning is ensured as in the above-mentioned embodiment. Further, the invention permits two or more rules to be held in the fuzzy inferrer 301.

What is claimed is:

1. A signature recognition apparatus comprising:
   input means for reading a handwritten signature and outputting handwriting data corresponding to the read handwritten signature;
   characteristic extraction means for extracting characteristics from the handwriting data outputted from the input means and outputting characteristic handwriting data in accordance with the extracted characteristic elements;
   sample generating means for receiving the characteristic handwriting data and generating a plurality of truth sample data corresponding to a qualified person's true handwritten signature and a plurality of falsehood sample data corresponding to other than the qualified person's true handwritten signature, each of said truth sample data and said falsehood sample data being the mathematical product of the received characteristic handwriting data multiplied by each of a plurality of different specified coefficients;
   learning control means for outputting a teacher signal representative of whether the characteristic hand-writing data is a qualified-person's true one; and
   neural net means for receiving the sample data plurally generated from the sample generating means, learning a more suitable coupling load coefficient by comparing the sample data and the teacher signal, and according to the coupling load coefficient determined through a learning operation, judging whether or not newly inputted characteristic handwriting data of a handwritten signature is the qualified-person's true handwritten signature.

2. A signature recognition apparatus according to claim 1, wherein the sample generating means includes:
   random number generating means for generating random numbers used to form the plurality of different specified coefficients;
   random number selecting means for selecting a random number from among the random numbers generated by the random number generating means;
   means for inputting the characteristic handwriting data thereinto; and
   multiplier means for generating the plurality of sample data by multiplying the inputted characteristic handwriting data by the random number selected by the random number selecting means.

3. A signature recognition apparatus according to claim 2, wherein a set value for generating the truth sample data and a set value for generating the falsehood sample data are respectively set in the selecting means; and the selecting means determines any one of the set values according to the teacher signal outputted from the learning control means and selects the random number according to the determined set value.

4. A signature recognition apparatus according to claim 2, wherein the sample generating means further includes a first storage means for temporarily storing the result obtained through performance of a multiplying operation in the multiplier means.

5. A signature recognition apparatus according to claim 1, wherein the neural net is of a two-layer perceptron structure.

6. A signature recognition apparatus according to claim 1, wherein the neural net means includes an output layer for processing the sample data in accordance with a specified internal function and, when performing the learning operation, the neural net means learns the coupling load coefficient in accordance with a linear function used as the internal function of the output layer and determines the coupling load coefficient while, when it is determined whether or not the characteristic handwriting data of the handwritten signature as newly inputted is the qualified-person's true handwriting data, the neural net means switches the internal function in the output layer from the linear function to a non-linear function.

7. A signature recognition apparatus according to claim 6, wherein a sigmoid function is set as the non-linear function.

8. A signature recognition apparatus according to claim 1, wherein a fuzzy inferer is disposed between the neural net means and the sample generating means for receiving the plurality of sample data generated from the sample generating means, performing a fuzzy inference on said sample data, and providing a result of said fuzzy inference to said sample generating means.

9. A signature recognition apparatus according to claim 1, further comprising switching means for routing the characteristic handwriting data outputted from the characteristic extraction means to one of the sample generating means and the neural net means.

10. A signature recognition apparatus according to claim 1, further comprising:
    display means for displaying whether or not the handwritten signature as newly inputted is the qualified-person's true handwritten signature, and for displaying the qualified-person's true handwritten signature by reproducing the same.

11. A signature recognition apparatus comprising:
    input means for reading a handwritten signature and outputting handwriting data corresponding to the handwritten signature read thereinto;
    characteristic extraction means for extracting characteristic handwriting data from the handwriting data outputted from the input means and outputting the characteristic handwriting data;
    learning control means for outputting a teacher signal corresponding to each of a qualified-persons's true handwritten signature and an unqualified-person's signature; and
    neural net means including an output layer for receiving the characteristic handwriting data and processing the received characteristic handwriting data in accordance with a specified internal function, the neural net means being capable of performing a learning operation through multiple comparisons made between a plurality of data obtained as a result of the processing performed in the output layer and the teacher signal and to judge, through the performance of the learning operation, whether or not newly inputted characteristic handwriting data is the qualified-person's true handwritten signature, and function setting means for, when the neural net means performs the learning operation, setting the internal function in the output layer to be a linear function, and when the neural net means determines whether the newly inputted characteristic handwriting data is the qualified-person's true handwritten signature, setting the internal function in the output layer to be a non-linear function.

12. A signature recognition apparatus according to claim 11, wherein the non-linear function is a sigmoid function.

13. A pattern recognition system comprising:

means for generating a set of characteristic data representative of a pattern to be recognized;

sample generating means for receiving said set of characteristic data, generating a set of true characteristic data representative of a pattern to be identified as a match and a set of false characteristic data representative of a pattern to be identified as a non-match by altering data in said set of characteristic data; and neural network means for receiving said set of true characteristic data and said set of false characteristic data, learning to identify matches and non-matches based on said true characteristic data and said false characteristic data, and generating outputs indicative of said matches and non-matches.

14. The pattern recognition system of claim 13, said sample generating means comprising:

random number generating means for generating random numbers; and means for multiplying data in said set of characteristic data by numbers generated by said random number generator to produce said set of true characteristic data and said set of false characteristic data.

15. The pattern recognition system of claim 14, wherein said random number generating means is for generating random numbers within a first range for said set of true characteristic data and for generating numbers within a second range, different from said first range, for said set of false characteristic data.

16. The pattern recognition system of claim 15, wherein said random numbers within said first range are smaller than said random numbers within said second range.

17. The pattern recognition system of claim 13, further comprising function setting means for setting a transfer function of neurons in an output layer of said neural network means to a linear function when said neural network means is learning to identify matches and non-matches based on said true characteristic data and said false characteristic data, and for setting said transfer function to a non-linear function when said neural network means is generating outputs indicative of said matches and non-matches.

18. A method of performing learning in a neural network, said method comprising the steps of:

generating a set of characteristic data representative of a pattern to be recognized;

generating a set of true characteristic data representative of a pattern to be identified as a match by altering data in said set of characteristic data;

generating a set of false characteristic data representative of a pattern to be identified as a non-match by altering data in said set of characteristic data; and training said neural network to generate outputs indicative of said matches and non-matches using said set of true characteristic data and said set of false characteristic data.

19. The method of claim 18, wherein:

said step of generating a set of true characteristic data comprises the steps of generating random numbers, and multiplying data in said set of characteristic data by numbers generated in said random number generating step to produce said set of true characteristic data; and said step of generating a set of false characteristic data comprises the steps of generating random numbers, and multiplying data in said set of characteristic data by numbers generated in said random number generating step to produce said set of false characteristic data.

20. The method of claim 19, wherein:

said step of generating random numbers in said step of generating a set of true characteristic data generates random numbers in a first range; and said step of generating random numbers in said step of generating a set of false characteristic data generates random numbers in a second range different from said first range.

21. The method of claim 20, wherein said random numbers within said first range are smaller than said random numbers within said second range.

22. The method of claim 21, further comprising the steps of:

setting a transfer function of neurons in an output layer of said neural network to a linear function when said neural network is learning to identify matches and non-matches based on said true characteristic data and said false characteristic data; and setting said transfer function to a non-linear function when said neural network is generating outputs indicative of said matches and non-matches.

23. A pattern recognition system comprising:

means for generating a set of characteristic data representative of patterns to be recognized;

neural network means for receiving said set of characteristic data, for learning to identify matches based on said characteristic data, and generating outputs indicative of said matches; and means for, when said neural network means is in a first mode of operation, setting an internal function of said neural network means to be a linear function, and when said neural network means is in a second mode of operation, setting said internal function of said neural network means to be a non-linear function, wherein said first mode of operation occurs when said neural network means is learning to identify said matches; and said second mode of operation occurs when said neural network means is generating said outputs indicative of said matches.

24. The pattern recognition system of claim 23, wherein said non-linear function is a sigmoid function.

* * * * *